No. 825,079. PATENTED JULY 3, 1906.
J. SCHROEDER.
HYDRAULIC MOTOR.
APPLICATION FILED AUG. 30, 1905.
3 SHEETS—SHEET 3.
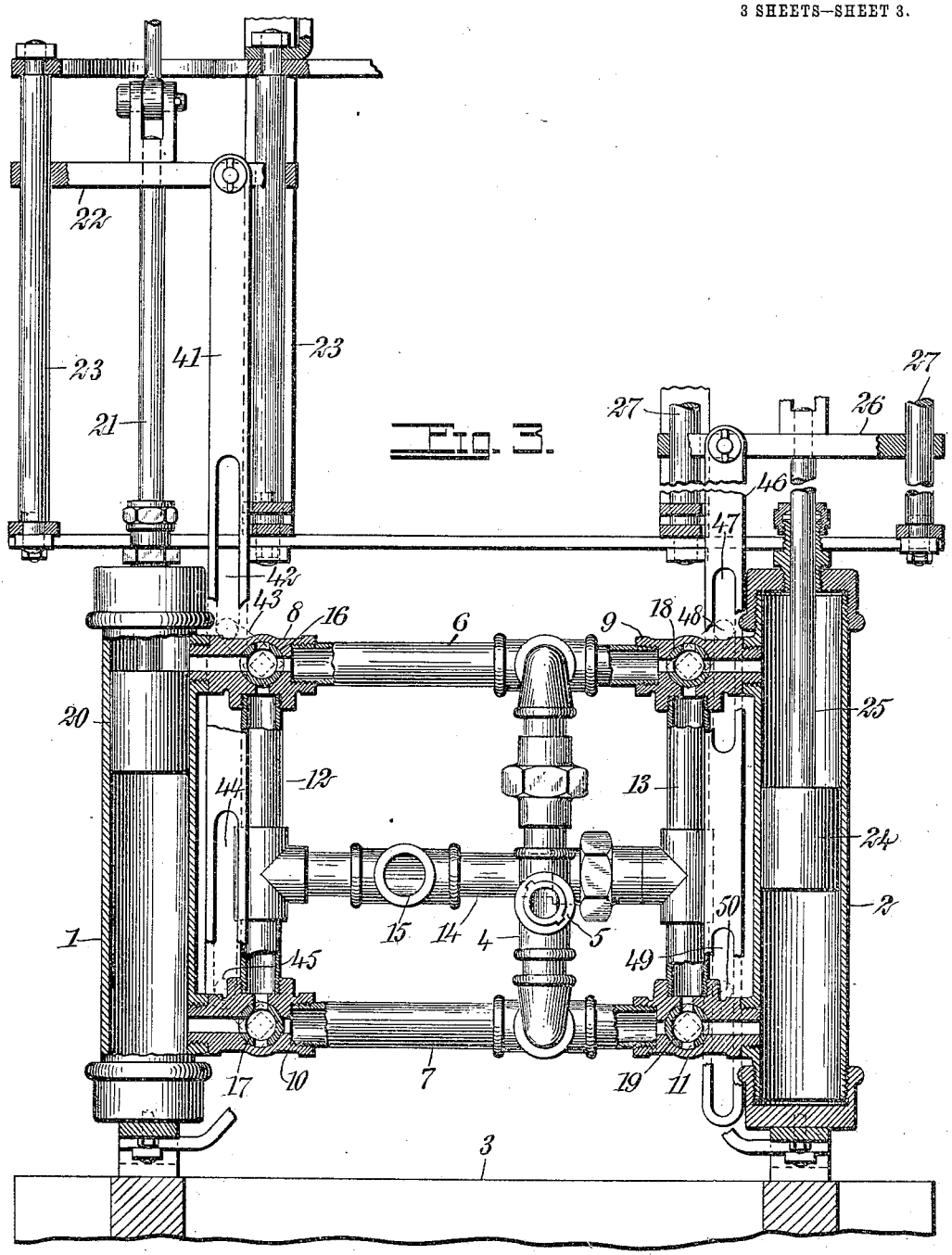
WITNESSES:
INVENTOR
John Schroeder
BY
ATTORNEYS

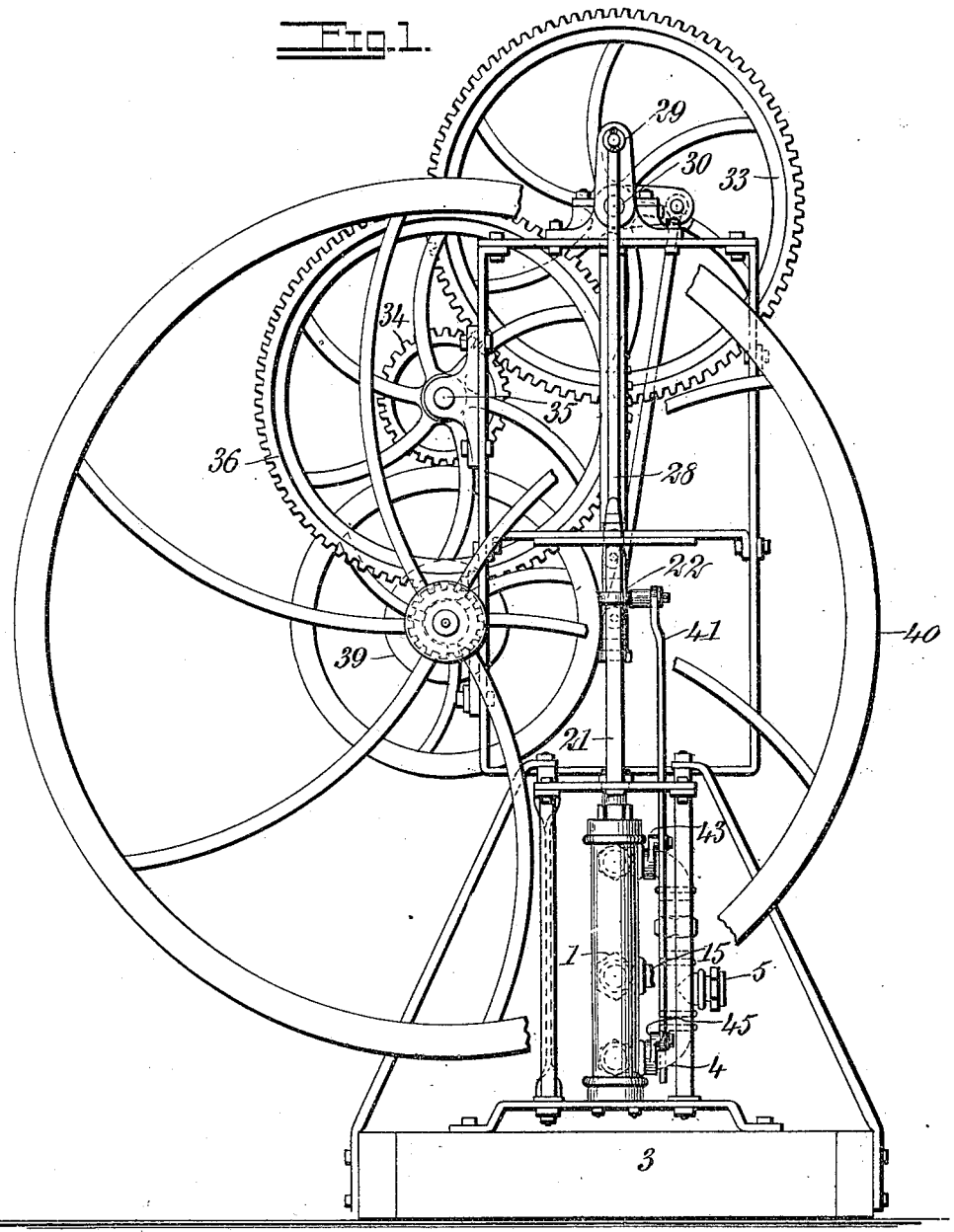

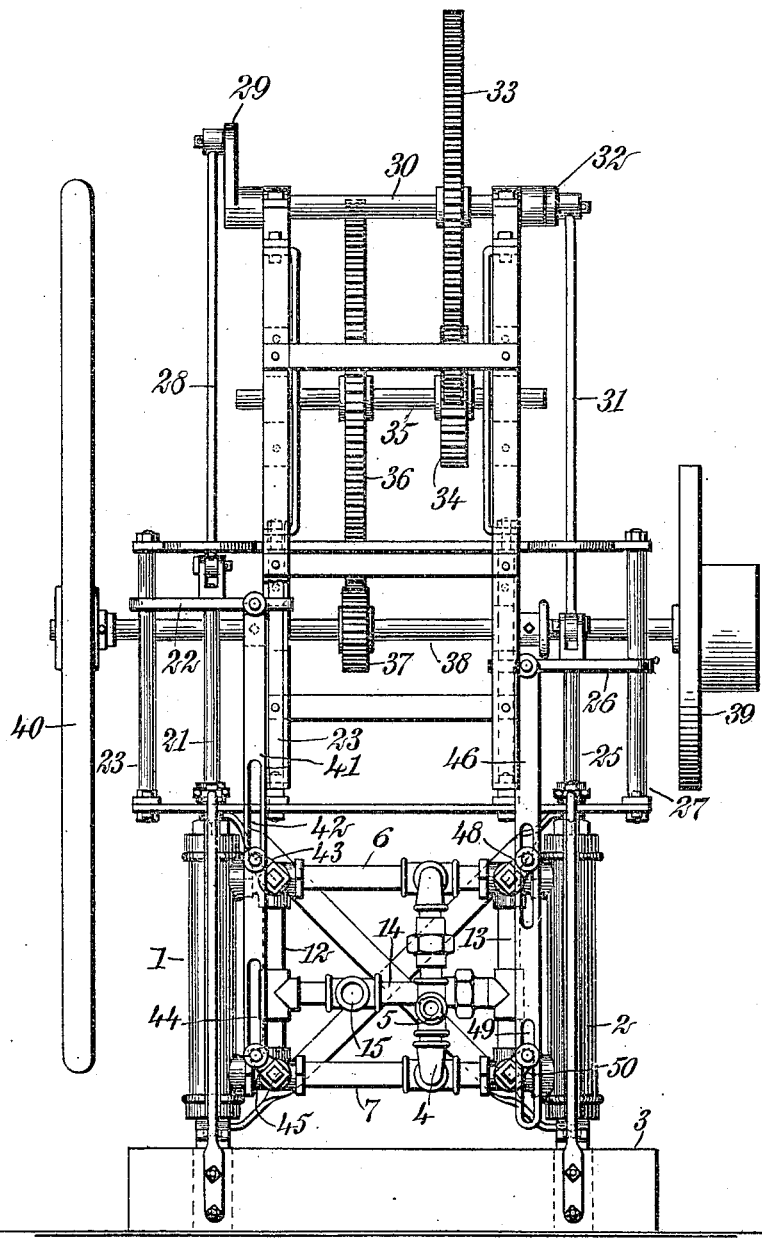

UNITED STATES PATENT OFFICE.

JOHN SCHROEDER, OF DAVENPORT, IOWA.

HYDRAULIC MOTOR.

No. 825,079.      Specification of Letters Patent.      Patented July 3, 1906.

Application filed August 30, 1905. Serial No. 276,338.

*To all whom it may concern:*

Be it known that I, JOHN SCHROEDER, a citizen of the United States, and a resident of Davenport, in the county of Scott and State of Iowa, have invented a new and Improved Hydraulic Motor, of which the following is a full, clear, and exact description.

This invention relates to improvements in hydraulic motors, the object being to provide a motor of this character that may be operated with comparatively low water-pressure and having a novel valve-controlling mechanism, and, further, to so arrange the parts that there will be no dead-centers.

I will describe a hydraulic motor embodying my invention and then point out the novel features in the appended claims.

Reference is to be had to the accompanying drawings, forming a part of this invention, in which similar characters of reference indicate corresponding parts in all the views.

Figure 1 is a side elevation of a motor embodying my invention. Fig. 2 is a front elevation thereof, and Fig. 3 is a sectional elevation.

The motor as here shown comprises two cylinders 1 2, mounted on a base-frame 3. An inlet-pipe 4 is provided with a hose-coupling 5 and at the upper end this inlet-pipe communicates with a pipe 6 and at the lower end with a pipe 7. The pipe 6 has couplings 8 9 leading into the upper portion of the cylinders, while the lower pipe 7 has similar couplings 10 11, providing communication with the lower portion of the cylinders. The couplings 8 10 have communication with each other through a vertical exhaust-pipe 12, and the couplings 9 11 are similarly connected by an exhaust-pipe 13. These two exhaust-pipes communicate one with the other through an exhaust-pipe 14, having an outlet 15.

In the coupling 8 is a three-way valve 16, and a similar three-way valve is arranged in the coupling 10, while the couplings 9 11 are provided with three-way valves 18 and 19.

Operating in the cylinder 1 is a piston 20, having its stem 21 connected to a cross-head 22, movable on guide-rods 23, supported in a suitable frame. In the cylinder 2 is a piston 24, the stem 25 of which connects with a cross-head 26, movable on guide-rods 27, also supported by a suitable frame. The stem of the piston 20 has a link connection 28 with a crank 29 on a crank-shaft 30, and the stem 25 has a link connection 31 with a crank 32 on said crank-shaft 30. It will be noted that the cranks 29 and 32 are arranged at right angles to each other, so that at certain times the two pistons will move in the same direction, and before one piston reaches the end of its stroke the other piston will be reversed, and therefore the dead-centers are practically overcome.

On the crank-shaft 30 is a gear-wheel 33, meshing with a pinion 34 on a counter-shaft 35, which carries a gear-wheel 36, engaging with a pinion 37 on a driving-shaft 38, on one end of which is connected a band-wheel 39 and on the other end a fly-wheel 40.

I will now describe the means for operating the valves to control the inlet and outlet of motive agent.

Pivotally connected to the cross-head 22 is an actuating-bar 41, provided with a longitudinal slot 42, receiving the wrist-pin of a crank 43, attached to the stem of the valve 16. The bar is also provided with a longitudinal slot 44, in which the pin of the crank 45 on the stem of the valve 17 engages. Pivotally connected to the cross-head 26 is a similar valve-actuating bar 46, having a slot 47 receiving the wrist-pin of the crank 48 on the stem of the valve 18, and the bar is also provided with a slot 49, receiving the wrist-pin of the crank 50 on the stem of the valve 19. Obviously slots 44 49 will have a width sufficiently greater than the wrist-pins to permit a slight swinging movement of the lower ends of bars 41 46.

In the operation when the parts are in the position indicated in Fig. 3 the two cylinders are receiving water above the pistons and the lower valves are turned for exhausting from the lower side of the pistons. As a piston reaches its extreme downward position the upper walls of the slots in its valve-operating bar will engage with the wrist-pins of the cranks on the upper and lower valve-stems, reversing the valves, so that the inlet will be at the lower side of the piston and the exhaust from the top, and of course during the upward movement the lower end walls of the slots will operate the valves to the first position. As before stated, the pistons at certain times move in the same direction, one slightly in advance of the other, which will cause a smooth or even running of the machine.

Having thus described my invention, I claim as new and desire to secure by Letters Patent—

1. In a hydraulic motor, a pair of cylinders, a water-supply pipe, an inlet and exhaust pipe leading into the upper ends of the two cylinders, an inlet and exhaust pipe leading into the lower ends of the cylinders, the said inlet and exhaust pipes being in communication with the inlet-pipe, vertical pipes connecting with opposite ends of said inlet and exhaust pipes, the said vertical pipes having communication with an outlet-pipe, three-way valves operating in the said upper and lower pipes, pistons in the cylinders, cross-heads with which the pistons connect, cranks on the stems of the valves, rods pivotally connected to said cross-heads and provided with slots for receiving the wrist-pins of the cranks, and guides for the cross-heads.

2. In a hydraulic motor, a pair of cylinders, pistons arranged in the cylinders, pipes leading into the upper and lower ends of the cylinders, a supply-pipe connecting with the first-named pipes, valves in said first-named pipes, cranks on the stems of the valves, cross-heads with which the pistons connect, rods pivotally connected to said cross-heads and extended downward therefrom, the said rods being provided with longitudinal slots for receiving the wrist-pins of the cranks, and a chain of gearing operated from the pistons.

In testimony whereof I have signed my name to this specification in the presence of two subscribing witnesses.

JOHN SCHROEDER.

Witnesses:
FRANK NEAL,
E. A. GOETTIG.